(12) United States Patent
Shen et al.

(10) Patent No.: US 11,208,052 B2
(45) Date of Patent: Dec. 28, 2021

(54) ASSEMBLING STRUCTURE FOR VEHICLE CARRYING DEVICE

(71) Applicant: KING ROOF INDUSTRIAL CO., LTD., Taichung (TW)

(72) Inventors: Shih-Chieh Shen, Taichung (TW); Chun-Yi Hsieh, Taichung (TW)

(73) Assignee: KING ROOF INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/828,430

(22) Filed: Mar. 24, 2020

(65) Prior Publication Data
US 2021/0300257 A1  Sep. 30, 2021

(51) Int. Cl.
*B60R 9/10* (2006.01)

(52) U.S. Cl.
CPC ...................... *B60R 9/10* (2013.01)

(58) Field of Classification Search
CPC ................................. B60R 9/06; B60R 9/10
USPC ........................................................ 224/519
See application file for complete search history.

(56) References Cited

U.S. PATENT DOCUMENTS

| | | | |
|---|---|---|---|
| 3,618,835 A * | 11/1971 | Terry | B60D 1/06 224/491 |
| 3,822,814 A * | 7/1974 | Baldi | B62D 43/02 224/502 |
| 3,869,075 A * | 3/1975 | Kissner | B62D 43/04 224/491 |
| 4,561,575 A * | 12/1985 | Jones | B62D 43/02 224/42.21 |
| 4,938,399 A * | 7/1990 | Hull | B60D 1/07 224/521 |
| 4,946,084 A * | 8/1990 | Britto | B62D 43/02 224/42.21 |
| 5,094,373 A * | 3/1992 | Lovci | B60R 9/06 224/282 |
| 5,104,015 A * | 4/1992 | Johnson | B60R 9/06 224/401 |
| 5,197,641 A * | 3/1993 | Montgomery, Jr. | B62D 43/002 224/42.21 |
| 5,333,888 A * | 8/1994 | Ball | B60D 1/52 280/504 |
| 5,344,175 A * | 9/1994 | Speer | B60D 1/58 224/521 |

(Continued)

*Primary Examiner* — Peter N Helvey
(74) *Attorney, Agent, or Firm* — Muncy, Geissler, Olds & Lowe, P.C.

(57) ABSTRACT

An assembling structure for a vehicle carrying device is provided, including: a tubular member, a first abutting member, an expansion mechanism and an actuating member. The tubular member has an axial direction and is configured to be inserted within a trailer hitch. A wall of the tubular member has a through hole. The first abutting member is movable along the axial direction and disposed in the tubular member. The expansion mechanism includes a second abutting member disposed on the first abutting member and an elastic member. The second abutting member is located within the through hole and urgeable to move by the first abutting member. The elastic member is disposed between the second abutting member and one of the tubular member and the first abutting member so that the second abutting member has a tendency to move radially in a direction toward the first abutting member.

12 Claims, 11 Drawing Sheets

(56) References Cited

U.S. PATENT DOCUMENTS

| | | | | |
|---|---|---|---|---|
| 5,423,566 A * | 6/1995 | Warrington | | B60D 1/52 |
| | | | | 224/521 |
| 5,469,998 A * | 11/1995 | Van Dusen | | B60D 1/52 |
| | | | | 224/42.21 |
| 5,547,116 A * | 8/1996 | Eckhart | | B60R 9/06 |
| | | | | 224/509 |
| 5,685,686 A * | 11/1997 | Burns | | B60R 9/06 |
| | | | | 224/282 |
| 5,730,345 A * | 3/1998 | Yeckley | | B60R 9/06 |
| | | | | 224/505 |
| 5,806,736 A * | 9/1998 | Kincart | | B62D 43/02 |
| | | | | 224/42.13 |
| 5,842,615 A * | 12/1998 | Goodness | | B60R 9/10 |
| | | | | 224/509 |
| 5,879,102 A * | 3/1999 | Koliopoulos | | B60R 9/06 |
| | | | | 403/374.1 |
| 5,884,930 A * | 3/1999 | Cluth | | B60D 1/38 |
| | | | | 280/497 |
| 6,089,431 A * | 7/2000 | Heyworth | | B60D 1/075 |
| | | | | 224/521 |
| 6,129,371 A * | 10/2000 | Powell | | B60R 9/06 |
| | | | | 224/502 |
| 6,189,748 B1 * | 2/2001 | Hutter | | B62D 43/00 |
| | | | | 224/42.21 |
| 6,199,735 B1 * | 3/2001 | Cothern | | B60R 9/06 |
| | | | | 224/509 |
| 6,607,346 B2 * | 8/2003 | Dunsch | | B62D 43/02 |
| | | | | 224/489 |
| 6,663,133 B1 * | 12/2003 | Rosenlund | | B60D 1/06 |
| | | | | 280/490.1 |
| 6,701,913 B1 * | 3/2004 | LeDuc | | B60R 9/06 |
| | | | | 126/276 |
| 6,835,021 B1 * | 12/2004 | McMillan | | B60D 1/155 |
| | | | | 280/504 |
| 6,974,147 B1 * | 12/2005 | Kolda | | B60D 1/52 |
| | | | | 280/506 |
| 7,004,491 B1 * | 2/2006 | Allsop | | B60D 1/52 |
| | | | | 280/506 |
| 7,448,640 B2 * | 11/2008 | Weaver | | B60D 1/06 |
| | | | | 280/506 |
| 7,600,774 B1 * | 10/2009 | Speer | | B60D 1/155 |
| | | | | 280/493 |
| 8,141,760 B2 * | 3/2012 | Kuschmeader | | B60R 9/10 |
| | | | | 224/497 |
| 8,262,121 B2 * | 9/2012 | Beck | | B60D 1/06 |
| | | | | 280/504 |
| 8,308,185 B2 * | 11/2012 | Weaver | | B60D 1/241 |
| | | | | 280/506 |
| 8,419,041 B2 * | 4/2013 | Bessette | | B60D 1/52 |
| | | | | 280/507 |
| 8,596,664 B2 * | 12/2013 | Lahn | | B60D 1/52 |
| | | | | 280/506 |
| 8,696,011 B2 * | 4/2014 | Despres | | B60D 1/06 |
| | | | | 280/478.1 |
| 8,833,791 B2 * | 9/2014 | Prescott | | B60D 1/07 |
| | | | | 280/506 |
| 8,944,516 B2 * | 2/2015 | Eidsmore | | B60P 1/28 |
| | | | | 298/1 A |
| 9,376,063 B2 * | 6/2016 | Hein | | B60R 9/06 |
| 9,616,722 B2 * | 4/2017 | Williams | | B60D 1/52 |
| 9,663,040 B1 * | 5/2017 | Shen | | B60R 9/06 |
| 9,963,082 B2 * | 5/2018 | Inagaki | | B60R 9/10 |
| 10,099,525 B1 * | 10/2018 | Phillips | | B60D 1/26 |
| 10,647,263 B2 * | 5/2020 | Viklund | | B60R 9/10 |
| 10,793,079 B1 * | 10/2020 | Shen | | B60R 9/06 |
| 2006/0065688 A1 * | 3/2006 | Hasz | | B60R 9/06 |
| | | | | 224/506 |
| 2006/0118586 A1 * | 6/2006 | Heravi | | B60R 9/0426 |
| | | | | 224/519 |
| 2006/0208456 A1 * | 9/2006 | Weaver | | B60D 1/06 |
| | | | | 280/491.5 |
| 2006/0278674 A1 * | 12/2006 | Young | | B60R 9/06 |
| | | | | 224/506 |
| 2009/0001109 A1 * | 1/2009 | Wilkins | | B60D 1/58 |
| | | | | 224/42.21 |
| 2009/0302078 A1 * | 12/2009 | Wang | | B60R 9/10 |
| | | | | 224/502 |
| 2015/0083770 A1 * | 3/2015 | Ziola | | B60D 1/52 |
| | | | | 224/501 |

* cited by examiner

ASSEMBLING STRUCTURE FOR VEHICLE CARRYING DEVICE

BACKGROUND OF THE INVENTION

Field of the Invention

The present invention relates to an assembling structure for a vehicle carrying device.

Description of the Prior Art

A vehicle carrying device such as a bicycle carrier is detachably assembled behind a vehicle by a trailer hitch mounted on the vehicle for carrying bicycles. A conventional bicycle carrier includes a connecting rod which is insertable into the trailer hitch, and the connecting rod and the trailer hitch are connected with each other by a pin member transversely penetrating therethrough. However, the connecting rod and the trailer hitch can shake relative to each other when the vehicle is moving, which results in loosing of the pin member and poor assembling stability. The pin member has to be rotated by a hand tool to tighten with the trailer hitch, which is inconvenience for operation. In addition, the connecting rod of the conventional bicycle carrier has a fixed diametric dimension which can only be applied to a fixed size of the trailer hitch. Even if the connecting rod is assembled to the trailer hitch with corresponding size, the connecting rod cannot be stably abutted against an inner wall of the trailer hitch due to long-term expansion or inaccuracy in manufacturing, which causes the bicycle carrier to shake easily when the vehicle is moving. Therefore, a tightening structure for preventing relative movement between the connecting rod and the trailer hitch is provided.

A conventional tightening structure includes a cam biased against and between two opposite side walls of the connecting rod and the trailer hitch so that the connecting rod and the trailer hitch are radially abutted against each other. However, the conventional tightening structure has a complicated configuration, which is inconvenient to manufacture; the cam of the tightening structure has a narrow adjustable range to bias against the connecting rod and the trailer hitch, which results in unstable connection and limited range of application.

The present invention is, therefore, arisen to obviate or at least mitigate the above-mentioned disadvantages.

SUMMARY OF THE INVENTION

The main object of the present invention is to provide an assembling structure for a vehicle carrying device which provides stable connection and is highly compatible.

To achieve the above and other objects, the present invention provides an assembling structure for a vehicle carrying device, including: a tubular member, a first abutting member, an expansion mechanism and an actuating member. The tubular member has an axial direction and is configured to be inserted within a trailer hitch of a vehicle. A wall of the tubular member has a through hole. The first abutting member is movable along the axial direction and disposed in the tubular member. The expansion mechanism includes a second abutting member movably disposed on the first abutting member and an elastic member. The second abutting member is located within the through hole and urgeable to move by the first abutting member. The elastic member is disposed between the second abutting member and one of the tubular member and the first abutting member so that the second abutting member has a tendency to move radially in a direction toward the first abutting member. The actuating member is connected with the first abutting member and configured to be externally operable to drive the first abutting member to move axially and urge the second abutting member to move radially.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 8 for a first preferable embodiment of the present invention. An assembling structure 1 for a vehicle carrying device of the present invention includes a tubular member 10, a first abutting member 20, an expansion mechanism 30 and an actuating member 40.

Figure 1:
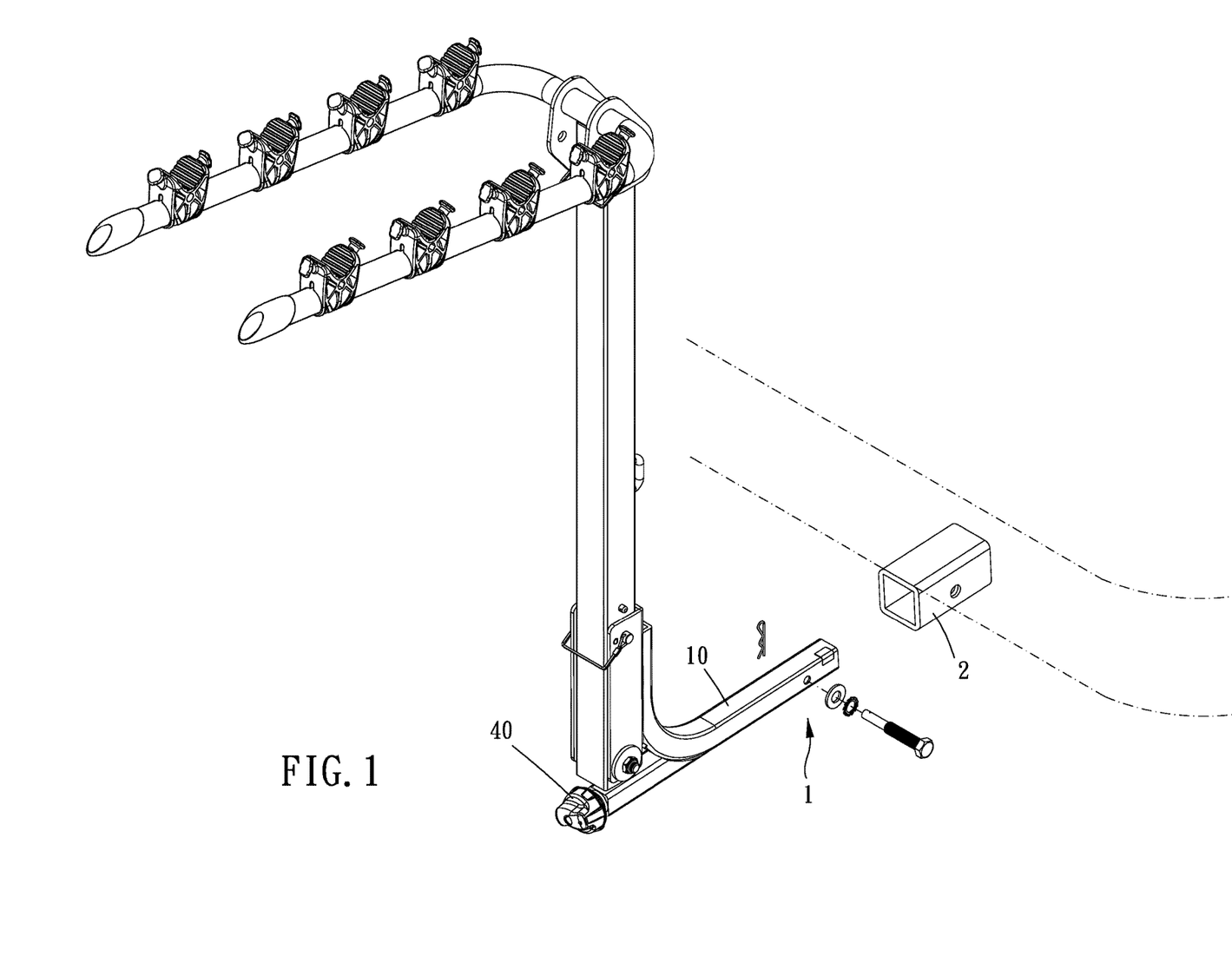
FIG. 1 is a stereogram of a vehicle carrying device of a first preferable embodiment of the present invention.
Figures 2, 3:
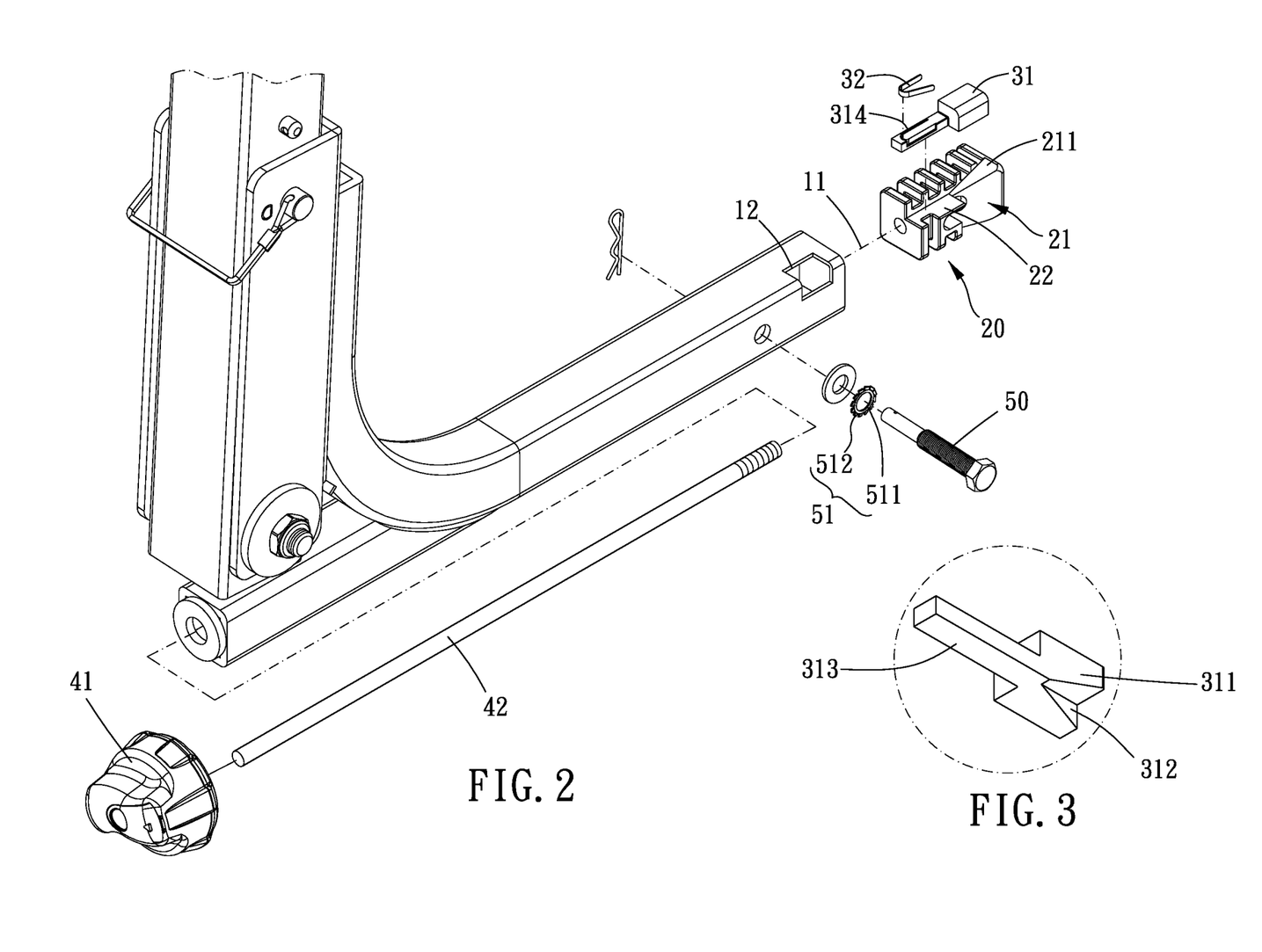
FIG. 2 is a breakdown drawing of the first preferable embodiment of the present invention.
FIG. 3 is a stereogram of a second abutting member of the first preferable embodiment of the present invention.
Figure 4:
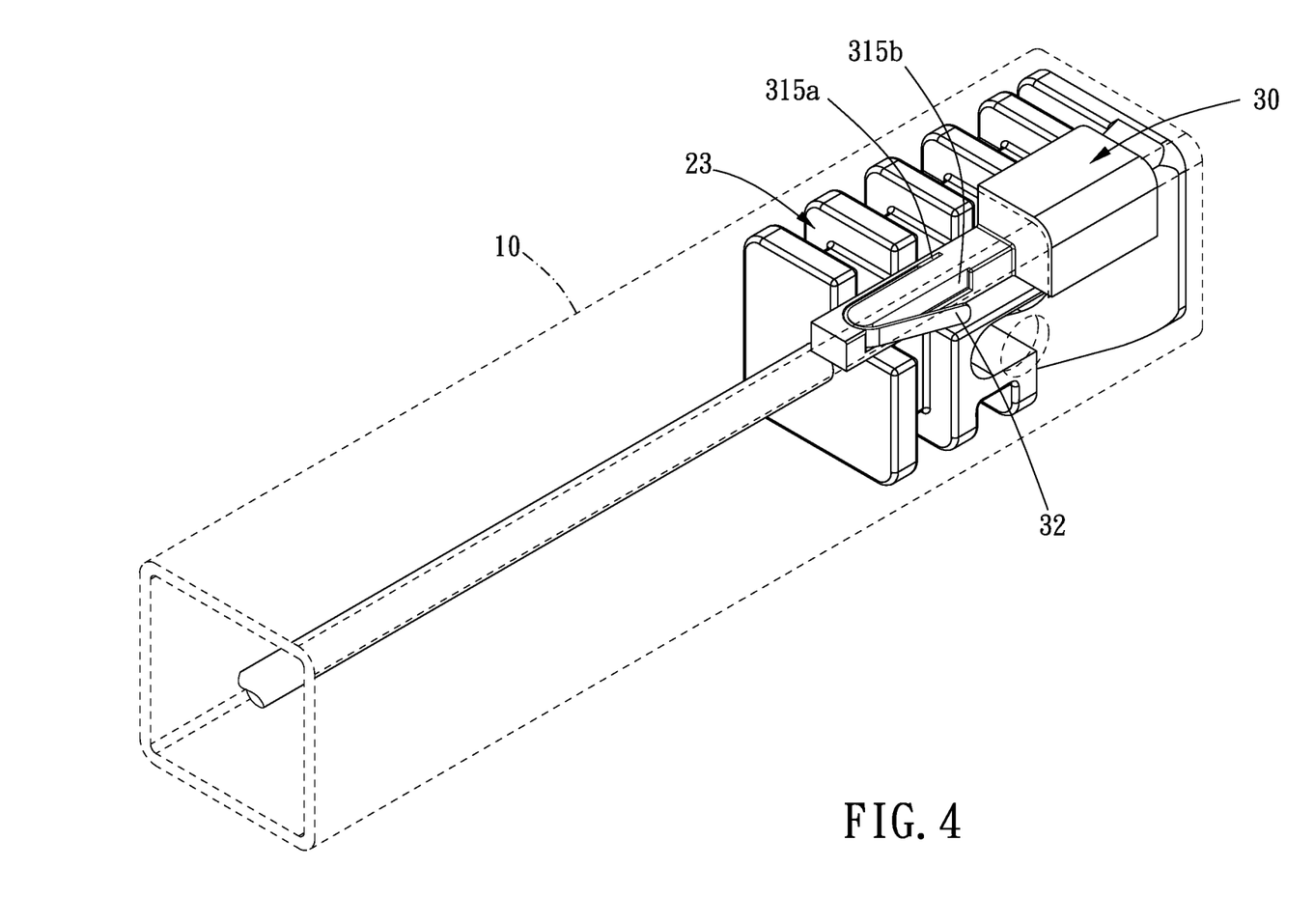
FIG. 4 is a stereogram of the first preferable embodiment of the present invention.
Figures 5, 6:
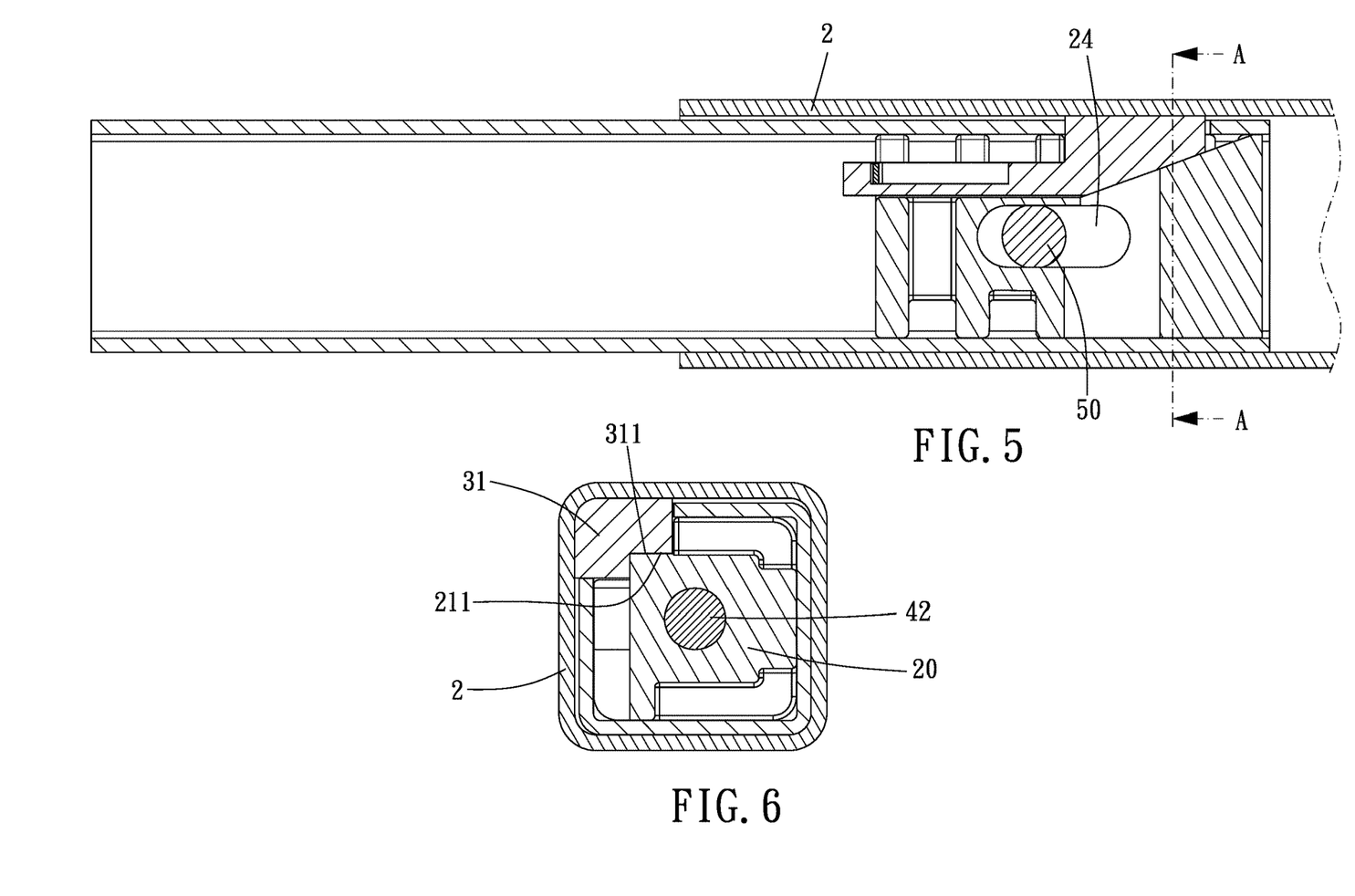
FIG. 5 is a partial cross-sectional view of the first preferable embodiment of the present invention.
FIG. 6 is a cross-sectional view taken along line A-A of FIG. 5.

The tubular member 10 has an axial direction 11 and is configured to be inserted within a trailer hitch 2 of a vehicle, and a wall of the tubular member 10 has a through hole 12. The first abutting member 20 is movable along the axial direction 11 and disposed in the tubular member 10. The expansion mechanism 30 includes a second abutting member 31 movably disposed on the first abutting member 20 and an elastic member 32. The second abutting member 31 is located within the through hole 12 and urgeable to move by the first abutting member 20, and the elastic member 32 is disposed between the second abutting member 31 and one of the tubular member 10 and the first abutting member 20 so that the second abutting member 31 has a tendency to move radially in a direction toward the first abutting member 20. The actuating member 40 is connected with the first abutting member 20 and configured to be externally operable to drive the first abutting member 20 to move axially and urge the second abutting member 31 to move radially. Therefore, the tubular member 10 and the trailer hitch 2 are stably connected with each other, and the assembling structure 1 is highly compatible.

At least one of the first abutting member 20 and the second abutting member 31 includes an inclined portion 21 tilted to the axial direction 11, and the other of the first abutting member 20 and the second abutting member 31 includes an abutting portion 311 which is abuttable against the inclined portion 21. When the first abutting member 20 is moved along the axial direction 11, the abutting portion 311 is moved along the inclined portion 21 and the expansion mechanism 30 is radially abutted against an inner surface of the trailer hitch 2. Therefore, the trailer hitch 2 and the tubular member 10 can be tightly connected with each other when diametrical dimensions of the trailer hitch 2 and the tubular member 10 are different from each other. Specifically, the inclined portion 21 includes two inclined guiding surfaces 211 which are adjacent to each other and tilted to the axial direction 11, and the abutting portion 311 includes two inclined abutting surfaces 312 which are abuttable against the two inclined guiding surfaces 211. When the first abutting member 20 and the second abutting member 31 are moved relative to each other, the two inclined guiding surfaces 211 urge the two inclined abutting surfaces 312. In this embodiment, the first abutting member 20 has the inclined portion 21, and the second abutting member 31 has the abutting portion 311 being urgeable to move radially within the through hole 12 by the first abutting member 20; the inclined portion 21 is a wedge projection, and the abutting portion 311 is a recession within which the wedge projection is received so that the wedge projection and the recession are stably abutted against each other and not easy to dislocate relative to each other. In other embodiments, the inclined portion and the abutting portion may be configured as inclined planes or arcuate convex surfaces.

The second abutting member 31 further includes a connecting portion 313 connected with the abutting portion 311 and extending axially, and the elastic member 32 is disposed on the connecting portion 313 and radially abutted against an inner wall of the tubular member 10. The tubular member 10 is square, and the through hole 12 is disposed at a corner of the tubular member 10. A corner of the first abutting member 20 corresponding to the through hole 12 has a notched portion 22 within which the second abutting member 31 and the elastic member 32 are received, and the notched portion 22 is disposed at a side of the inclined portion 21 tilted to the axial direction 11 so that the first abutting member 20 and the second abutting member 31 are smoothly movable axially relative to each other. A diametrical dimension of the connecting portion 313 is smaller than a diametrical dimension of the abutting portion 311, and the connecting portion 313 is connected with a side of the abutting portion 311 radially adjacent to the first abutting member 20. Therefore, when the abutting portion 311 is urged to move axially, the connecting portion 313 can be axially moved within the notched portion 22 without interference. However, the through hole and the second abutting member may be correspondingly disposed at the same side of the tubular member. Specifically, the connecting portion 313 includes an engaging groove 314 receiving the elastic member 32, the engaging groove 314 is open toward the inner wall of the tubular member 10, and the elastic member 32 partially protrudes beyond the engaging groove 314. In this embodiment, the elastic member 32 is a flat spring, and the engaging groove 314 is U-shaped and includes two extending segments 315a, 315b which extend in a direction toward the abutting portion 311 and are parallel to each other. One of the two extending segments 315a, 315b is laterally open toward the inner wall of the tubular member 10. Therefore, a side of the elastic member 32 close to the abutting portion 311 provides sufficient elastic force to maintain abutment between the abutting portion 311 and the inclined portion 21. In other embodiments, the engaging groove may have other configurations; the elastic member may be a stretching spring, compression spring, or the like; the elastic member may be disposed between the abutting portion and the inclined portion.

The actuating member 40 includes an operating portion 41 configured to be externally operable and a rod member 42 non-rotatably connected with the operating portion 41. The rod member 42 is screwed with one of the tubular member 10 and the first abutting member 20 so as to drive the first abutting member 20 to move axially relative to the tubular member 10. Therefore, a radial position of the second abutting member 31 is adjustable by rotating the operating portion 41, which is easy to operate. In this embodiment, the rod member 42 and the first abutting member 20 are screwed with each other; when the operating portion 41 is rotated, the first abutting member 20 which is square is non-rotatable relative to the tubular member 10 and moved toward or away from the operating portion 41 along the axial direction 11. However, the rod member may be screwed to the tubular member and axially comovable with the first abutting member. An outer peripheral surface of the first abutting member 20 preferably has a plurality of notches 23 spaced apart from one another so as to have a light weight and reduce frictions with the wall of the tubular member 10 for smooth movement.

The assembling structure 1 further includes a pin member 50 configured to laterally connect the trailer hitch 2 and the tubular member 10. The first abutting member 20 has a penetrating hole 24 disposed laterally therethrough and extending axially, and the pin member 50 is disposed through the penetrating hole 24 and the first abutting member 20 is axially movable relative to the pin member 50 so as to provide stable connection and prevent the tubular member 10 from withdrawing from the trailer hitch 2. In this embodiment, the pin member 50 is a screwed rod which is configured to be screwed with at least one of the tubular member 10 and the trailer hitch 2, and an annular pad 51 is configured to be disposed between a head of the screwed rod and the trailer hitch 2. The annular pad 51 includes a ring 511 and a plurality of fins 512 which are radially tilted and disposed circumferentially on the ring 511 so that the plurality of fins 512 are elastically deformable and connected between the head of the screwed rod and the trailer hitch 2 in a manner of multi-points connection for stable connection.

Figure 7:
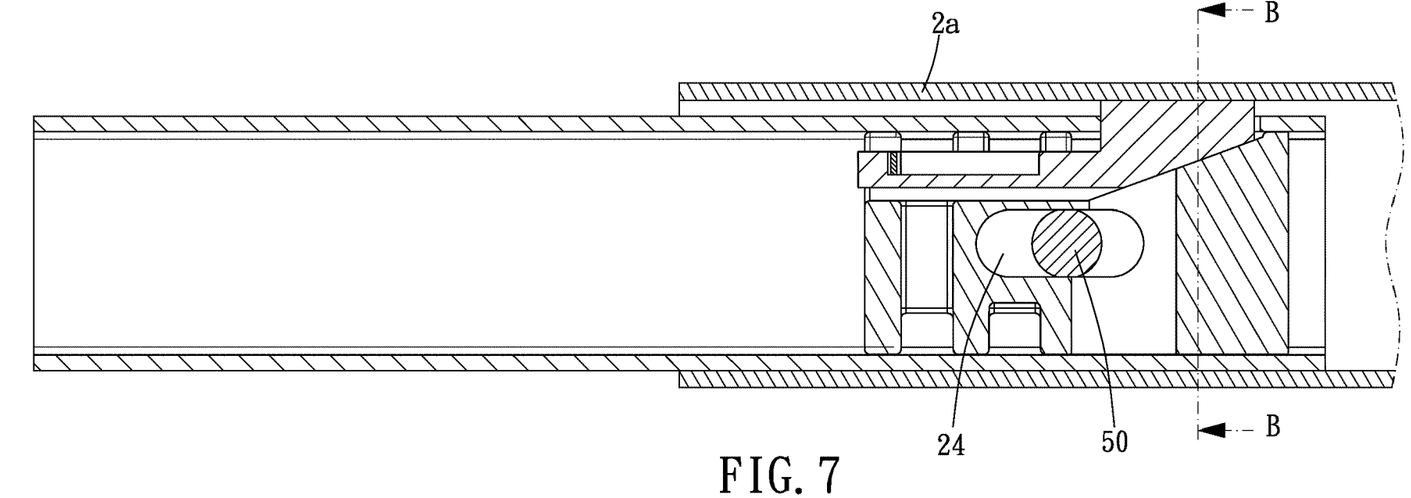
FIG. 7 is a partial cross-sectional view of the first preferable embodiment of the present invention when it is assembled to another trailer hitch.
Figure 8:
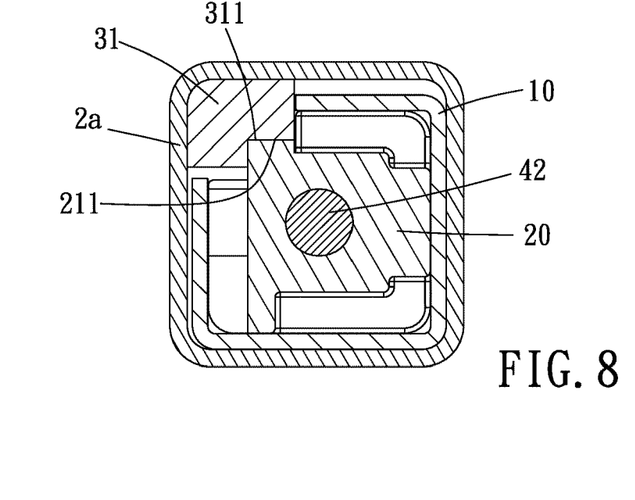
FIG. 8 is a cross-sectional view taken along line B-B of FIG. 7.
Figure 9:
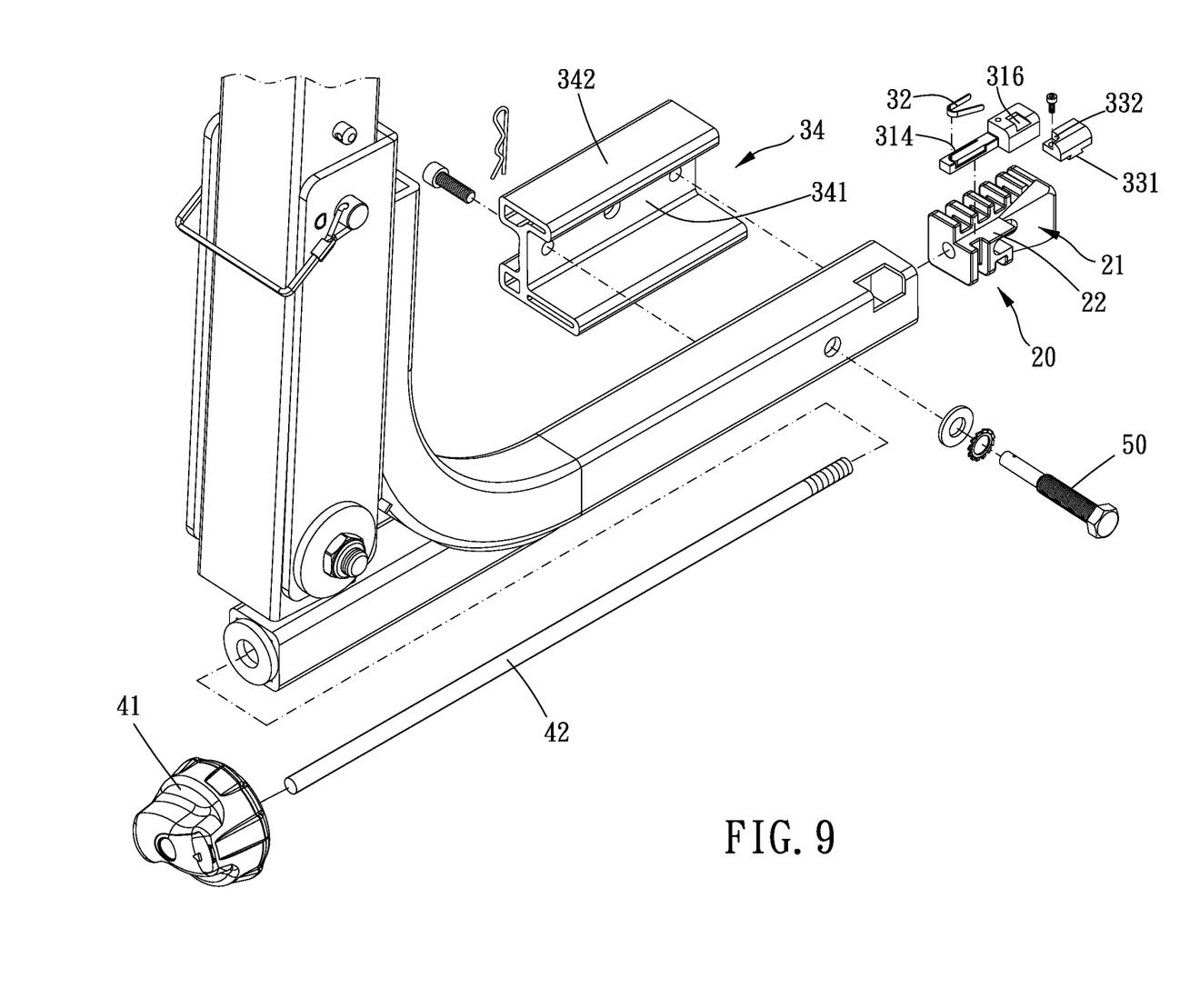
FIG. 9 is a breakdown drawing of a second preferable embodiment of the present invention.
Figure 10:
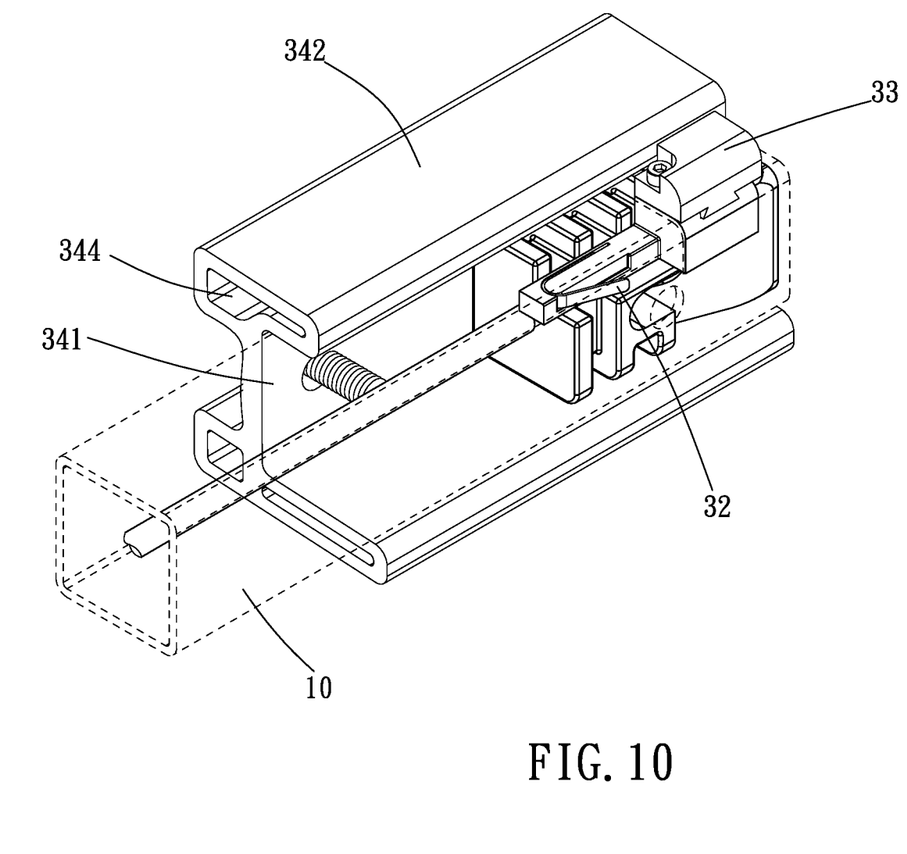
FIG. 10 is a stereogram of the second preferable embodiment of the present invention.
Figure 11:
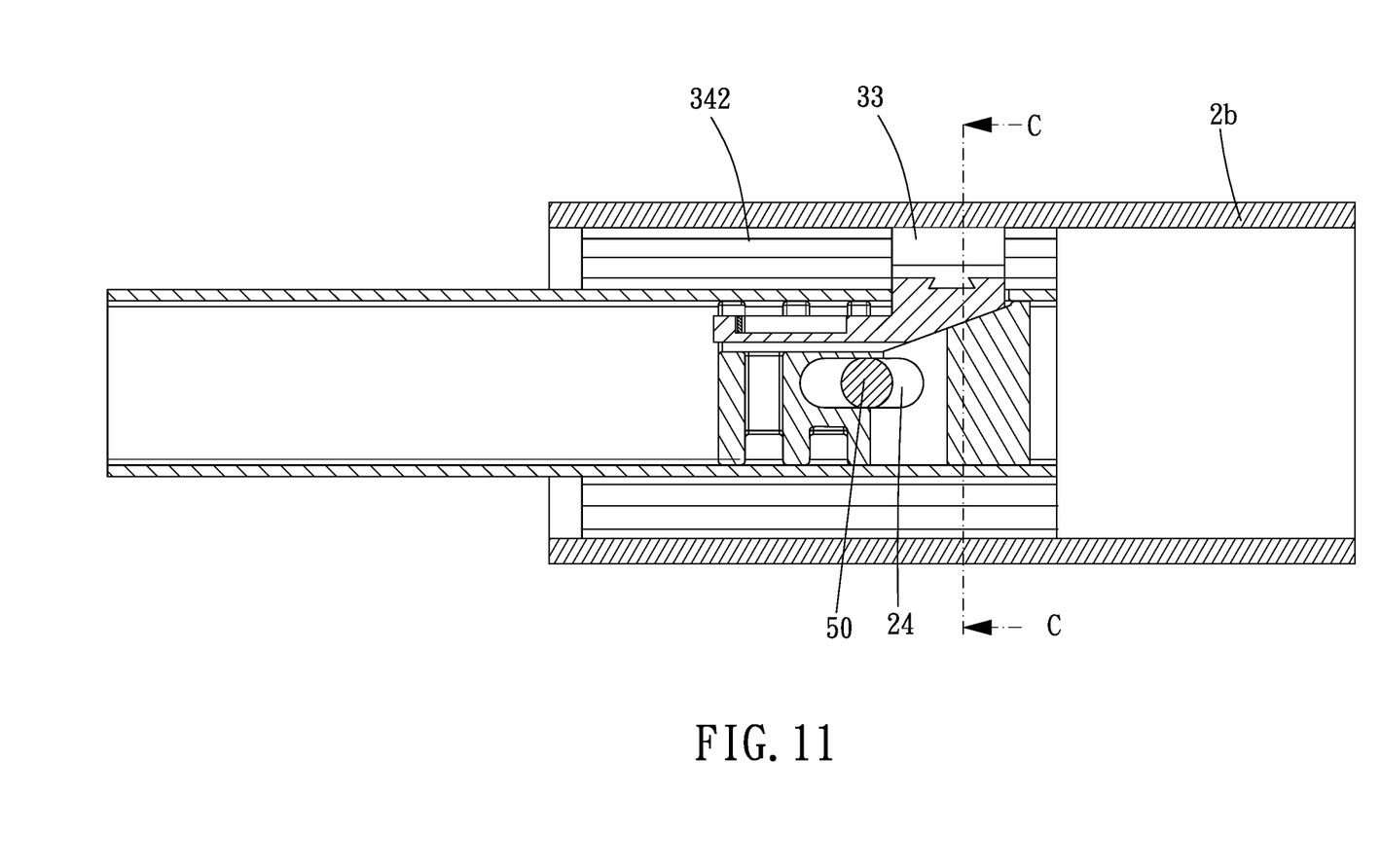
FIG. 11 is a partial cross-sectional view of the second preferable embodiment of the present invention.
Figure 12:
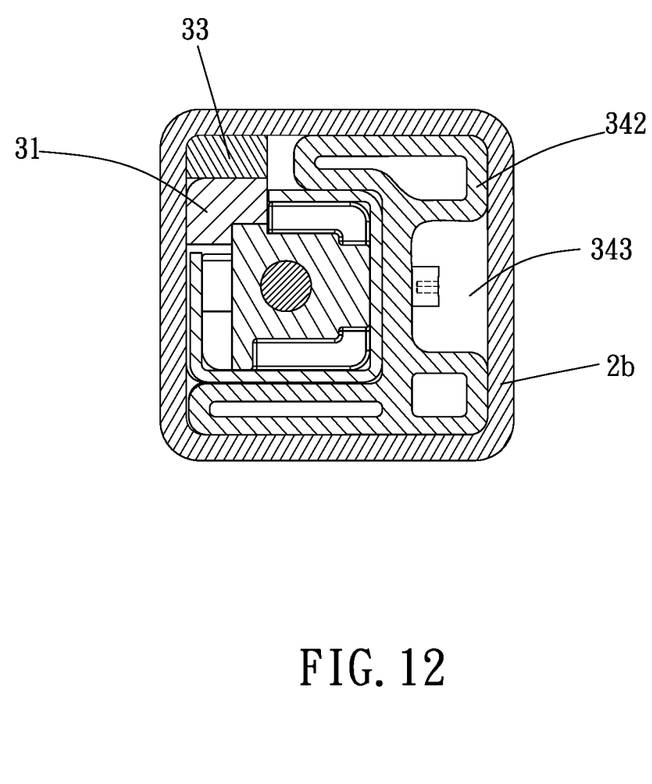
FIG. 12 is a cross-sectional view taken along line C-C of FIG. 11.

When the assembling structure 1 is assembled to the trailer hitch 2 with a smaller diametric dimension, a distance that the second abutting member 31 protruding beyond the tubular member 10 is shorter, as shown in FIGS. 5 and 6; when the assembling structure 1 is assembled to the trailer hitch 2a with a larger diametrical dimension, the actuating member 40 drives the first abutting member 20 to move axially toward the operating portion 41, and the abutting portion 311 is moved along the inclined portion 21 to urge the second abutting member 31 to move radially and be abutted against the inner surface of the trailer hitch 2a, as shown in FIGS. 7 and 8. By any of the structures as described above, the assembling structure 1 is easily adjustable and configured to be stably assembled to one of the trailer hitches whose sizes are different.

Please refer to FIGS. 9 to 12 showing a second preferable embodiment of the present invention. The expansion mechanism 30 further includes a spacer 33 which is detachably connected to the second abutting member 31. The spacer 33 protrudes beyond an outer surface of the tubular member 10 and is configured to be abutted against the inner surface of the trailer hitch 2b which increase a maximum diametric dimension of the assembling structure 1 for applying to the trailer hitch 2b with different sizes. One of the spacer 33 and the second abutting member 31 has an engaging convex 331, and the other of the spacer 33 and the second abutting member 31 has an engaging concave 316 within which the engaging convex 331 is engageable for easy assembling. In this embodiment, the spacer 33 is connected on a side wall of the second abutting member 31; the engaging convex 331 is a dovetailed tenon, and the engaging concave 316 is a dovetailed groove which is engageable with the dovetailed tenon, which is simple in structure and easy to process. Preferably, the spacer 33 further has a dodge slot 332, and the dodge slot 332 is configured to receive a fastener connecting the spacer 33 and the second abutting member 31 so as to increase assembling stability and prevent the fastener from protruding beyond the side wall of the second abutting member 31. In other embodiments, the spacer may be L-shaped and connected to a corner of the second abutting member corresponding to the through hole so as to be diagonally abutted against the inner surface of the trailer hitch.

The expansion mechanism 30 further includes a supporting frame 34 which is detachably connected to the tubular member 10, and the supporting frame 34 is connected to at least one outer side surface of the tubular member 10 and configured to be abutted against the inner surface of the trailer hitch 2b, which increase the maximum diametric dimension of the assembling structure 1 for applying to trailer hitch 2b with different sizes. Specifically, the supporting frame 34 includes an assembling portion 341 which is configured for at least one fastener to be disposed therethrough and connected to the wall of the tubular member 10 and two supporting portions 342 which are transversely connected to two opposite sides of the assembling portion 341. Each of the two supporting portions 342 extends along a thickness direction of the assembling portion 341 and is abutted against and between the outer surface of the tubular member 10 and the inner surface of the trailer hitch 2b. The supporting frame 34 and the spacer 33 are disposed on two opposite corners of the tubular member 10. Therefore, the supporting frame 34, the tubular member 10 and the trailer hitch 2b are not easy to shake relative to one another and have preferable structural stability. In this embodiment, the two supporting portions 342 and the assembling portion 341 define a receiving portion 343 therebetween for receiving the at least one fastener so as to prevent the at least one fastener from protruding beyond the two supporting portions 342; the supporting frame 34 is integrally made in one piece so as to have preferable structural strength; each of the two supporting portions 342 includes at least one hollow portion 344 extending axially, which reduces manufacturing cost and a weight of the supporting frame 34.

Figure 13:
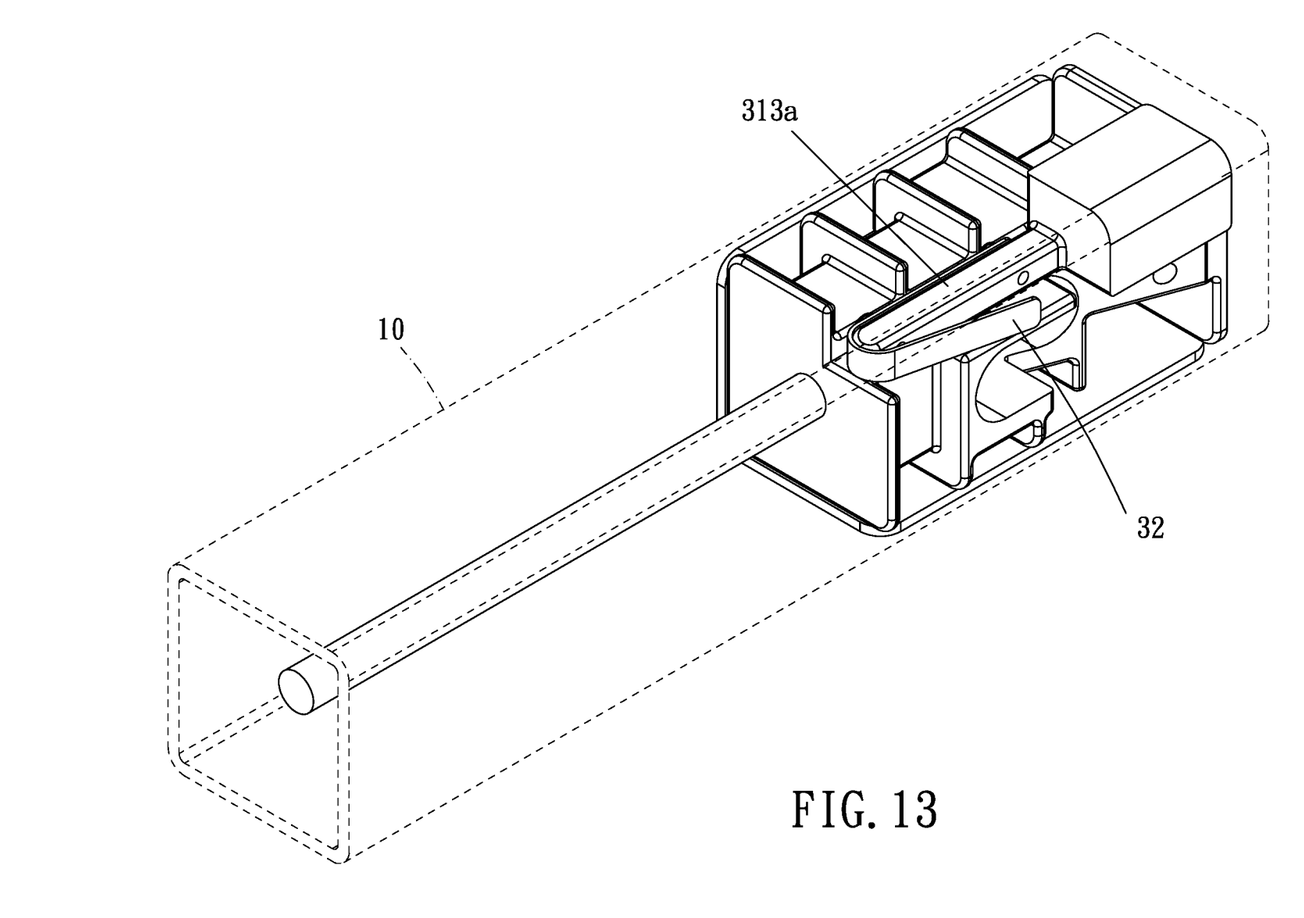
FIG. 13 is a stereogram of a third preferable embodiment of the present invention.
Figure 14:
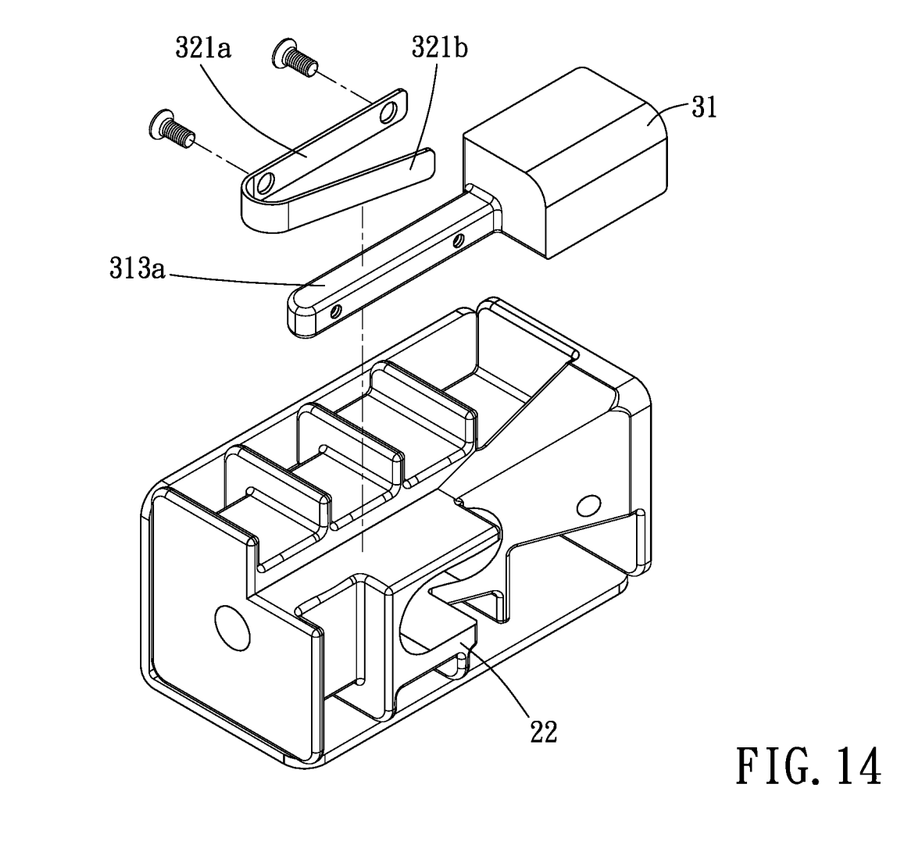
FIG. 14 is a partial breakdown drawing of the third preferable embodiment of the present invention.

Please refer to FIGS. 13 and 14 showing a third preferable embodiment of the present invention. The elastic member 32 includes two elastic arms 321a, 321b bendingly connected with each other. One of the two elastic arms 321a is detachably connected to a side wall of the connecting portion 313a, and the other of the two elastic arms 321b is elastically abutted against the inner wall of the tubular member 10. In this embodiment, the connecting portion 313a is located between the two elastic arms 321a, 321b, and the two elastic arms 321a, 321b respectively face two opposite side walls of the connecting portion 313a so that the elastic member 32 is not easy to skew during deformation for stable operation and easy processing and assembling. However, both of the two elastic arms may be disposed between the side wall of the connecting portion and the inner wall of the tubular member.

Although particular embodiments of the invention have been described in detail for purposes of illustration, various modifications and enhancements may be made without departing from the spirit and scope of the invention. Accordingly, the invention is not to be limited except as by the appended claims.

What is claimed is:
1. An assembling structure for a vehicle carrying device, including:
a tubular member, having an axial direction, being configured to be inserted within a trailer hitch of a vehicle, a wall of the tubular member having a through hole;
a first abutting member, being movable along the axial direction and disposed in the tubular member;
an expansion mechanism, including a second abutting member movably disposed on the first abutting member and an elastic member, the second abutting member being located within the through hole and urgeable to move by the first abutting member, the elastic member being disposed between the second abutting member and one of the tubular member and the first abutting member so that the second abutting member has a tendency to move radially in a direction toward the first abutting member;
an actuating member, connected with the first abutting member, configured to be externally operable to drive the first abutting member to move axially and urge the second abutting member to move radially.
2. The assembling structure for vehicle carrying device of claim 1, wherein at least one of the first abutting member and the second abutting member includes an inclined portion tilted to the axial direction, and the other of the first abutting member and the second abutting member includes an abutting portion which is abuttable against the inclined portion.
3. The assembling structure for vehicle carrying device of claim 2, wherein the inclined portion includes two inclined guiding surfaces which are adjacent to each other and tilted to the axial direction, the abutting portion includes two inclined abutting surfaces which are abuttable against the two inclined guiding surfaces; when the first abutting member and the second abutting member are moved relative to each other, the two inclined guiding surfaces urge the two inclined abutting surfaces.
4. The assembling structure for vehicle carrying device of claim 1, wherein the second abutting member includes an abutting portion being urgeable to move radially within the through hole by the first abutting member and a connecting portion connected with the abutting portion and extending axially, and the elastic member is disposed on the connecting portion and radially abutted against an inner wall of the tubular member.
5. The assembling structure for vehicle carrying device of claim 4, wherein a diametrical dimension of the connecting portion is smaller than a diametrical dimension of the abutting portion, and the connecting portion is connected with a side of the abutting portion radially adjacent to the first abutting member.

6. The assembling structure for vehicle carrying device of claim 4, wherein the connecting portion includes an engaging groove receiving the elastic member, the engaging groove is open toward the inner wall of the tubular member, and the elastic member partially protrudes beyond the engaging groove.

7. The assembling structure for vehicle carrying device of claim 4, wherein the elastic member includes two elastic arms bendingly connected with each other, one of the two elastic arms is detachably connected to a side wall of the connecting portion, and the other of the two elastic arms is elastically abutted against the inner wall of the tubular member.

8. The assembling structure for vehicle carrying device of claim 1, further including a pin member configured to laterally connect the trailer hitch and the tubular member, wherein the first abutting member has a penetrating hole disposed laterally therethrough and extending axially, and the pin member is disposed through the penetrating hole and the first abutting member is axially movable relative to the pin member.

9. The assembling structure for vehicle carrying device of claim 1, wherein the expansion mechanism further includes a spacer which is detachably connected to the second abutting member, and the spacer protrudes beyond an outer surface of the tubular member and is configured to be abutted against an inner surface of the trailer hitch.

10. The assembling structure for vehicle carrying device of claim 1, wherein the expansion mechanism further includes a supporting frame which is detachably connected to the tubular member, and the supporting frame is connected to at least one outer side surface of the tubular member and configured to be abutted against an inner surface of the trailer hitch.

11. The assembling structure for vehicle carrying device of claim 1, wherein the tubular member is square, the through hole is disposed at a corner of the tubular member, and a corner of the first abutting member corresponding to the through hole has a notched portion within which the second abutting member and the elastic member are received.

12. The assembling structure for vehicle carrying device of claim 3, wherein the tubular member and the first abutting member are square, the through hole is disposed at a corner of the tubular member, and a corner of the first abutting member corresponding to the through hole has a notched portion within which the second abutting member and the elastic member are received; an outer peripheral surface of the first abutting member has a plurality of notches spaced apart from one another; the inclined portion is a wedge projection, the abutting portion is a recession within which the wedge projection is received; the second abutting member includes the abutting portion being urgeable to move radially within the through hole by the first abutting member and a connecting portion connected with the abutting portion and extending axially, and the elastic member is disposed on the connecting portion and radially abutted against an inner wall of the tubular member; a diametrical dimension of the connecting portion is smaller than a diametrical dimension of the abutting portion, and the connecting portion is connected with a side of the abutting portion radially adjacent to the first abutting member; the connecting portion includes an engaging groove receiving the elastic member, the engaging groove is open toward the inner wall of the tubular member, and the elastic member partially protrudes beyond the engaging groove; the elastic member is a flat spring, the engaging groove is U-shaped and includes two extending segments which extend in a direction toward the abutting portion and are parallel to each other, one of the two extending segments is laterally open toward the inner wall of the tubular member; the assembling structure further includes a pin member configured to laterally connect the trailer hitch and the tubular member, the first abutting member has a penetrating hole disposed laterally therethrough and extending axially, and the pin member is disposed through the penetrating hole and the first abutting member is axially movable relative to the pin member; the pin member is a screwed rod which is configured to be screwed with at least one of the tubular member and the trailer hitch, an annular pad is configured to be disposed between a head of the screwed rod and the trailer hitch, the annular pad includes a ring and a plurality of fins which are radially tilted and disposed circumferentially on the ring; the actuating member includes an operating portion configured to be externally operable and a rod member non-rotatably connected with the operating portion, and the rod member is screwed with one of the tubular member and the first abutting member.

* * * * *